(12) United States Patent
Imhof et al.

(10) Patent No.: US 7,951,475 B2
(45) Date of Patent: May 31, 2011

(54) VENT VALVE FOR ACID BATTERIES

(75) Inventors: Wolfgang Imhof, Kefenrod-Helfersdorf (DE); Friedrich Kramm, Büdingen (DE); Christian Recker, Büdingen (DE)

(73) Assignee: Deutsche EXIDE GmbH, Budingen (DE)

( * ) Notice: Subject to any disclaimer, the term of this patent is extended or adjusted under 35 U.S.C. 154(b) by 1351 days.

(21) Appl. No.: 11/406,173

(22) Filed: Apr. 18, 2006

(65) Prior Publication Data

US 2006/0240315 A1    Oct. 26, 2006

(30) Foreign Application Priority Data

Apr. 26, 2005    (DE) .................. 10 2005 019 296

(51) Int. Cl.
 H01M 2/12    (2006.01)
 H01M 2/36    (2006.01)
 H01M 6/14    (2006.01)
(52) U.S. Cl. ............... 429/86; 429/72; 429/82; 429/300
(58) Field of Classification Search ............. 429/72
 See application file for complete search history.

(56) References Cited

U.S. PATENT DOCUMENTS

| 2,409,964 | A |   | 10/1946 | Smith |   |
|---|---|---|---|---|---|
| 4,317,872 | A | * | 3/1982 | Varma | ............. 429/302 |
| 4,352,364 | A |   | 10/1982 | Orsino et al. |   |
| 5,407,760 | A |   | 4/1995 | Kasner et al. |   |
| 5,455,124 | A |   | 10/1995 | Schollenberger |   |
| 5,571,633 | A | * | 11/1996 | Hagiuda | ............ 429/100 |
| 6,051,332 | A |   | 4/2000 | Verhoog et al. |   |
| 6,368,741 | B1 | * | 4/2002 | Hackel et al. | ............ 429/53 |
| 6,376,119 | B1 |   | 4/2002 | Nann et al. |   |
| 6,491,176 | B1 |   | 12/2002 | Schollenberger et al. |   |
| 2003/0215698 | A1 | * | 11/2003 | Schulte-Ladbeck | ............ 429/56 |

FOREIGN PATENT DOCUMENTS

| DE | 3934687 C1 | 3/1991 |
| DE | 197 03 444 C1 | 11/1998 |
| EP | 0 222 447 A1 | 5/1987 |
| EP | 0 504 573 A1 | 9/1992 |

(Continued)

OTHER PUBLICATIONS

Doriga, Machine translation of FR 2458910 A, Feb. 1981.*

(Continued)

*Primary Examiner* — Basia Ridley
*Assistant Examiner* — Sean P Cullen
(74) *Attorney, Agent, or Firm* — Paul & Paul

(57) ABSTRACT

The present invention concerns a vent valve for acid batteries comprising a substantially cylindrical plug portion (28) which is designed for being brought into engagement with a cell opening of the acid battery (1) and which has at least one passage opening communicating the cell interior of the acid battery with the ambient atmosphere, wherein provided in the passage opening is a valve arrangement (29) having an inlet communicating with the cell interior and an outlet connected to the ambient atmosphere. In order to provide a vent valve for an acid battery, in particular an acid battery with fixed electrolyte, which is simple and inexpensive to produce and which affords improved protection against the escape of battery acid, it is proposed in accordance with the invention that at least one turbulence chamber (30) follows the passage opening of the plug portion (28) in the direction of the cell interior and a gas-permeable filter unit (31, 31') follows the turbulence chamber (30).

11 Claims, 4 Drawing Sheets

| | FOREIGN PATENT DOCUMENTS | | | FR | 2 374 376 A1 | 9/1992 |
|----|----|----|----|----|----|----|
| EP | 0 554 535 | A1 | 11/1992 | | | |
| EP | 0 756 338 | A1 | 1/1997 | | OTHER PUBLICATIONS | |
| EP | 794582 | A1 * | 9/1997 | | | |
| FR | 2458910 | A * | 2/1981 | Steffahn et al., Machine translation of EP 794582 A1, Sep. 1997.* | | |
| FR | 2 576 149 | A1 | 1/1985 | | | |
| FR | 2 551 172 | A1 | 3/1985 | * cited by examiner | | |

VENT VALVE FOR ACID BATTERIES

FIELD OF THE INVENTION

The invention concerns a vent valve which is suitable in particular for acid batteries with fixed electrolyte. In addition the invention concerns acid batteries with one or more such vent valves.

BACKGROUND OF THE INVENTION

Acid batteries (accumulators) are used in the most widely varying areas, for example in vehicles as starter batteries or as a sole energy storage and delivery means. Usually the batteries comprise one or more cell vessels with plate blocks which are fitted therein, comprising positive and negative plates. The plates of each plate set have projections which protrude from the plates, referred to as lugs, and which are electrically connected together by way of connecting straps. The connecting straps are in turn connected to the poles which are usually passed to the exterior through openings (pole ductings) in the cover of the cell vessel for electrical connection of the battery. The plates are surrounded by electrolyte in the cell vessel, usually an acid electrolyte based on sulphuric acid. The electrolyte can be in the form of a liquid electrolyte or also fixed in a get as so-called gel electrolyte. Silicic acid is usually employed as the gel-forming agent.

By virtue of the generation of gas in the electrolytic processes in the battery and in order to compensate for fluctuations in pressure due to the generation of heat, the cell vessels of acid batteries may not be gas-tightly or pressure-tightly closed but have one or more vent valves. The vent valves provide for pressure equalisation between the interior of the cell vessels and the ambient atmosphere in the event of a high pressure in the cell with respect to the ambient atmosphere. As the acid electrolyte which is usually based on sulphuric acid is very corrosive, the vent valves should be so designed that, when gas issues from the cell vessel, no acid is entrained out of the cell vessel with the gas, in the form of liquid or in the form of acid mist.

Acid batteries are transported on land, across sea and by rail and also by air freight. In accordance with those transport regulations a battery is classified as being non-spillable if it stands up inter alia to a) a vibration test and b) a reduced-pressure test, in accordance with the following test provisions.
a) Vibration Test The battery is secured on the platform on a vibrator device and a simple harmonic movement involving an amplitude of 0.8 mm (1.6 mm maximum total deflection) is applied. The vibration frequency is varied at a rate of 1 Hz/min from 10 Hz to 55 Hz and back to 10 Hz. The entire frequency range from the lowest frequency to the highest frequency and back again is covered in 95±5 minutes for each individual securing position (vibration direction) for the battery. The battery has to be tested in three mutually perpendicularly positions, in which respect at least one upside-down position must be included, in which the filling openings and vent valves of the battery face down.
b) Reduced-Pressure Test After the vibration test the same battery is stored for 6 hours at 24±4° C., being exposed to a pressure difference of at least 88 kPa. The battery is tested once again in three mutually perpendicular positions for at least 6 hours in each position, wherein in this test also at least one upside-down position must be included, in regard to the filling opening and the vent valves.

As the filling openings of acid batteries can be well sealed off, the greatest danger of battery acid escaping in the vibration test and in the reduced-pressure test occurs in the upside-down positions. Most conventional vent valves in accordance with the state of the art do not satisfy those severe demands.

EP 0 638 944 A1 describes a closure plug for a lead accumulator, which is intended to prevent acid mists from escaping from the cell and also to exclude the damaging influence of the acid on the function of a safety valve provided in the closure plug. The closure plug includes a microporous frit and a pressure relief valve in a housing which can be fixed in sealed relationship with respect to the cell cover in the electrolyte filling opening. The microporous frit is disposed upstream of the pressure relief valve in the gas discharge direction. The microporous frit is intended to catch fine droplets of acid aerosol so that the gas flow reaching the pressure valve is freed of the liquid and cannot cause any corrosion damage to the delicate metal parts such as compression springs and the like. It has been found however that this arrangement cannot adequately prevent the escape of acid mists under severe conditions like the above-described tests.

DE 39 34 687 C1 discloses a closed, maintenance-free accumulator with a fixed electrolyte, which can be used in an upright and a lying position. A filling opening with an excess-pressure valve is provided in the cover of the accumulator housing. Provided towards the inside of the housing, at the ducting opening, is a projection from which a pipe extends parallel to the cover wall and opens into the gas space in the upper region of the accumulator. The path of gas issuing from the accumulator therefore leads through the pipe to the projection in the housing cover and then outwardly through the excess-pressure valve. In the lying position of the accumulator, the pipe must face upwardly in a vertical direction with its mouth opening so that small amounts of liquid which issue from the fixed electrolyte cannot pass into the upwardly disposed mouth of the pipe and thus out of the accumulator housing.

Further vent valves and closure plugs for accumulators are described in the following publications: EP 0 920 063 A1, EP 0 756 338 A1, FR 2 576 149, EP 0 588 823 A1, GB 567 824, EP 1 001 905 A1, EP 0 875 949 B1, EP 0 588 823 A1, U.S. Pat. No. 4,352,364, FR 2 674 376, FR 2 551 172, EP 0 554 535 A1, EP 0 504 573 and EP 0 222 447 A.

The known closure systems and vent valves either suffer from the disadvantage that they do not guarantee adequate protection from the escape of battery acid under severe conditions or they are of a technically very expensive and complicated structure, or both.

SUMMARY OF THE INVENTION

Therefore an object of the present invention is to provide a vent valve for an acid battery, in particular an acid battery with fixed electrolyte, which is simple and inexpensive to produce and which affords improved protection against the escape of battery acid.

That object is attained by a vent valve for acid batteries comprising a substantially cylindrical plug portion which is designed for being brought into engagement with a cell opening of the acid battery and which has at least one passage opening communicating the cell interior of the acid battery with the ambient atmosphere, wherein provided in the passage opening is a valve arrangement having an inlet communicating with the cell interior and an outlet connected to the ambient atmosphere, and wherein at least one turbulence chamber follows the passage opening of the plug portion in the direction of the cell interior and a gas-permeable filter unit follows the turbulence chamber.

The vent valve according to the invention has major advantages over conventional valves. If an increased pressure occurs in an acid battery, gas is urged out of the gas space above the electrolyte level through the vent valve and out of the cell vessel. In that situation liquid, in particular electrolyte acid, is frequently entrained. The battery acid can attack parts of the valve unit in the vent valve and damage the valve unit and destroy the function thereof. In addition escaping battery acid can injure or damage people and articles which come into contact therewith. In the case of electrolytes which are fixed in a gel (gel electrolytes), small gel particles and other solids can also be entrained with the flow of gas. Such gel particles and other solids can clog the vent valve, in particular the valve unit, and detrimentally affect or nullify the function thereof. If the vent valve is clogged and pressure relief of the cell vessel can no longer take place, there is the danger of the cell vessel breaking or splitting open at another location. With the vent valve according to the invention that risk is considerably reduced in comparison with known valves.

In the case of the vent valve according to the invention the gas flow must firstly pass the filter unit. It then passes into the turbulence chamber arranged downstream thereof in the gas flow direction and from there passes through the valve into the ambient atmosphere.

The filter unit performs two functions. On the one hand solids such as for example gel from the gel electrolyte are retained and do not pass into the turbulence chamber and thus also not into the valve. That prevents solids closing off the valve. In addition liquid mist or liquid drops entrained by the escaping gas are deposited in the filter unit so that they cannot pass through the turbulence chamber into the valve unit and through that to the ambient atmosphere. It has been found however that the provision of a filter unit alone is frequently not sufficient to completely separate entrained liquid from the gas flow. Often a part of the entrained liquid still passes through the filter unit where it will then pass into the valve and is either deposited therein or is carried entirely outwardly into the ambient atmosphere. In accordance with the invention therefore provided in the gas flow direction downstream of the filter unit and upstream of the inlet of the valve is a turbulence chamber in which the gas flow is once again subjected to turbulence and remaining entrained liquid is separated out of the gas flow. The amount of liquid which passes into the valve can thereby be kept very low. As the entrained liquid is generally corrosive battery acid, that reduces an attack on the component parts of the valve and the service life of the valve is increased. In addition considerably less of the corrosive battery acid reaches the ambient atmosphere, than is the case with conventional vent valve arrangements.

In a preferred embodiment of the invention which in accordance with the application is referred to as dual-chamber system, the turbulence chamber is followed by a filter chamber which communicates with the turbulence chamber by way of one or more passage openings and in which the filter unit is arranged. The filter chamber has one or more inlet openings which are in communication with the gas space above the electrolyte level in the cell vessel. The filter unit is arranged between the inlet opening or inlet openings of the filter chamber and the outlet opening or outlet openings into the turbulence chamber in such a way that gas which flows through the filter chamber necessarily flows through the filter unit. Desirably the filter unit is so designed that it fills the entire filter chamber. According to the invention the filter unit is produced from one or more gas-permeable porous bodies, wherein the term porous body in accordance with this invention is interpreted broadly and preferably includes a frit, a foam, a non-woven fabric, a porous diaphragm, a filter paper or a cloth. In the case of layer-like material such as a diaphragm, filter paper or cloth, the filter unit can be made up of a plurality of mutually superposed layers of such a material. It is also possible for various such porous bodies or porous materials to be assembled in combination with each other to form the filter unit. For example the filter unit can include in succession in the direction of gas flow, a diaphragm or a filter paper, then a non-woven material and thereupon again a diaphragm or a filter unit. The filter unit should be sufficiently gas-permeable so that an increased pressure or a reduced pressure in the acid battery can be quickly removed. It should however also be of a porosity which affords a good filter action and adequate area for separating off liquid.

In an alternative embodiment to the dual-chamber system, which in accordance with the application is referred to as a single-chamber system, the filter unit is fixed upstream of the inlet opening of the turbulence chamber. In that case no separate filter chamber is provided for the filter unit. The filter unit can be fixed upstream of the inlet opening of the turbulence chamber in various ways, for example by bonding to the bottom plate of the turbulence chamber in the region around the inlet opening by means of an adhesive or by welding thereto. Alternatively the filter unit can also be in the form of a cap which is fitted over the end of the turbulence chamber and which extends over the inlet opening of the turbulence chamber. Alternatively it is also possible to use a cap which is produced for example from plastic material and into which the material of the filter unit is fitted and which is then fitted over the lower end of the turbulence chamber and secured thereto. Such a cap can be secured for example by a screw closure or a clip closure. In that case the outside of the end of the turbulence chamber and the inside of the cap are correspondingly provided with a screwthread or latching devices. In order to ensure a through flow of the filter unit which is fitted into such a cap, the cap has one or more inlet openings. That embodiment has the further advantage that the cap can be removed and the filter unit easily replaced.

Usually vent valves are arranged in the cover of the cell vessel of an acid battery beside the pole ductings. A suitable bore or a valve seat is provided for that purpose. Advantageously the bore or the valve seat is provided with a female screwthread and the vent valve on the plug portion is provided with a male screwthread so that the vent valve can be firmly and securely placed. A seal, for example an O-ring, is desirably provided between the bore or the valve seat and the vent valve in order to ensure that gas or liquid cannot escape past the vent valve.

Although the vent valve can be of substantially any cross-section the cylindrical shape is most appropriate for example for a screw connection of the vent valve to the opening or the valve seat respectively. At least the plug portion which is brought into engagement with the opening or the valve seat respectively is of a substantially cylindrical shape. The adjoining turbulence chamber and/or the filter chamber are therefore advantageously also of a substantially cylindrical configuration for direct fixing to the plug portion.

In a particularly advantageous configuration of the vent valve according to the invention disposed in the turbulence chamber are turbulence-producing bodies which are designed for deflecting and causing turbulence in the gas flow passing through the turbulence chamber. Such turbulence-producing bodies can be bodies which are loose-fill bodies which are not fixedly secured to the turbulence chamber wall, of any geometry. However turbulence-producing bodies which extend from the turbulence chamber wall are also suitable such as deflection plates, apertured plates and the like, which produce turbulence in and/or deflect the gas flow within the turbulence chamber.

The invention also includes an acid battery with at least one vent valve of the above-described kind. Preferably the acid battery includes a fixed electrolyte, desirably a gel electrolyte. The level of the fixed electrolyte within the cell vessel is usually so high that it extends to above the electrode plates and a gas space remains above that level, as far as the cover of the cell vessel. In this embodiment of acid batteries only small amounts of liquid issue from the fixed electrolyte and can then be entrained with the gas as it flows out. Such acid batteries can also be operated with the vent valve according to the invention in a lying position or upside-down.

BRIEF DESCRIPTION OF THE DRAWINGS

Further advantages, features and embodiments of the invention will be clearly apparent from the description hereinafter and the accompanying drawings.

DETAILED DESCRIPTION OF THE INVENTION

Figure 1:
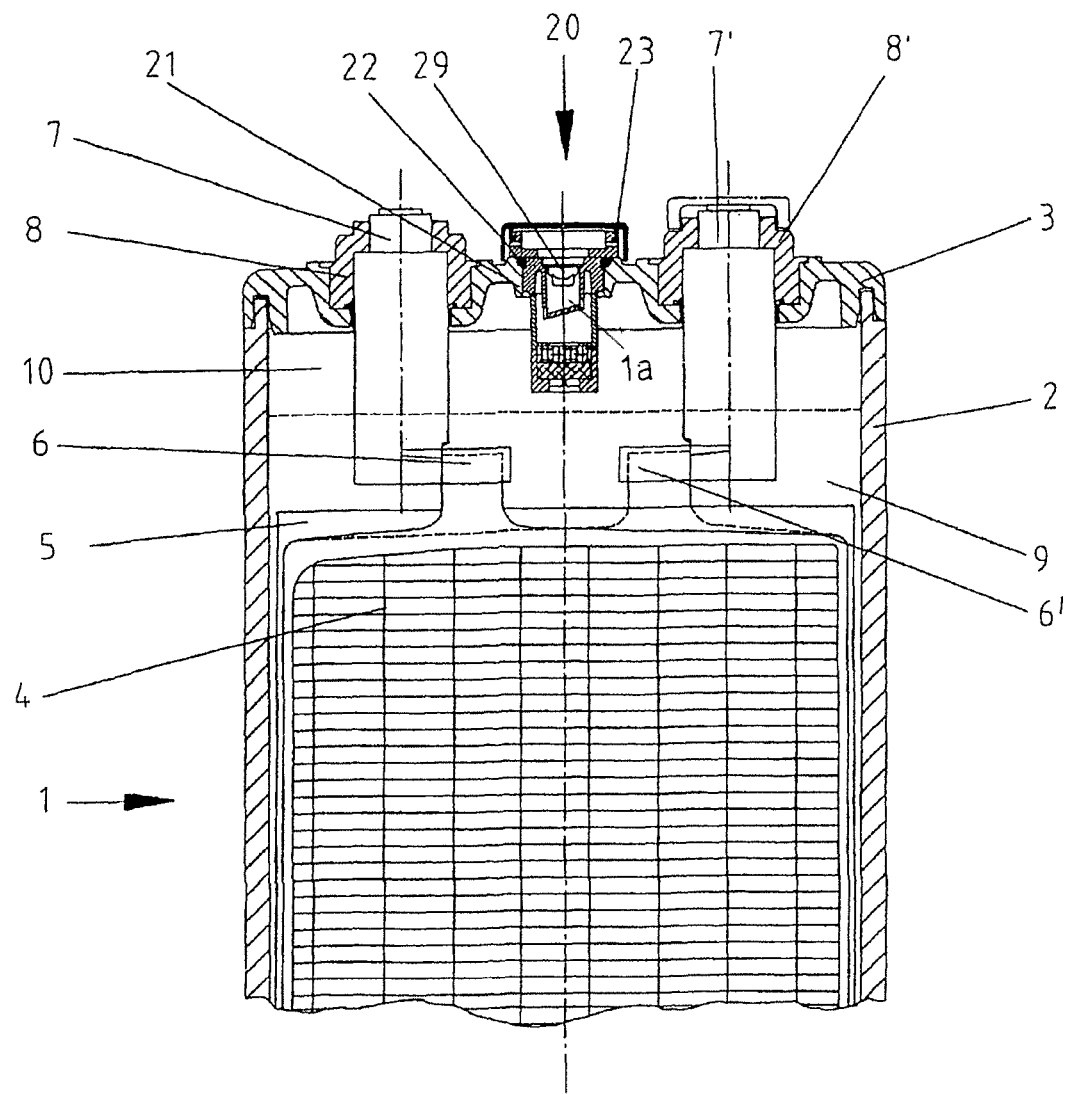
FIG. 1 shows a view in vertical section through an acid battery with a vent valve according to the invention in the form of a dual-chamber system.

FIG. 1 is a vertical view in section of an acid battery 1 with a cell vessel 2 which is closed by a cover 3. A vent valve comprising a substantially cylindrical plug portion is brought into engagement with a cell opening 2a of the acid battery 1 and which has at least one passage opening 1a communicating the cell interior with the ambient atmosphere. The electrode plates 4 are disposed in the cell vessel in the usual way. Separators 5 are arranged between the electrode plates 4 in order to keep them at a spacing from each other and to prevent them from touching each other. Extending vertically upwardly from each electrode plate 4 is a portion, referred to as the lug. The lugs of the positive plates and the lugs of the negative plates are electrically connected together by way of respective connecting straps 6 and 6'. The connecting straps 6 and 6' are in turn connected to the pole terminals 7 and 7' which extend outwardly from the cell vessel through the cover 3 through pole ductings 8 and 8' respectively. The cell vessel 2 of the acid battery 1 shown in FIG. 1 is filled with a gel electrolyte 9. There is a gas space 10 above the gel electrolyte 9, as far as the cover 3.

Figure 2:
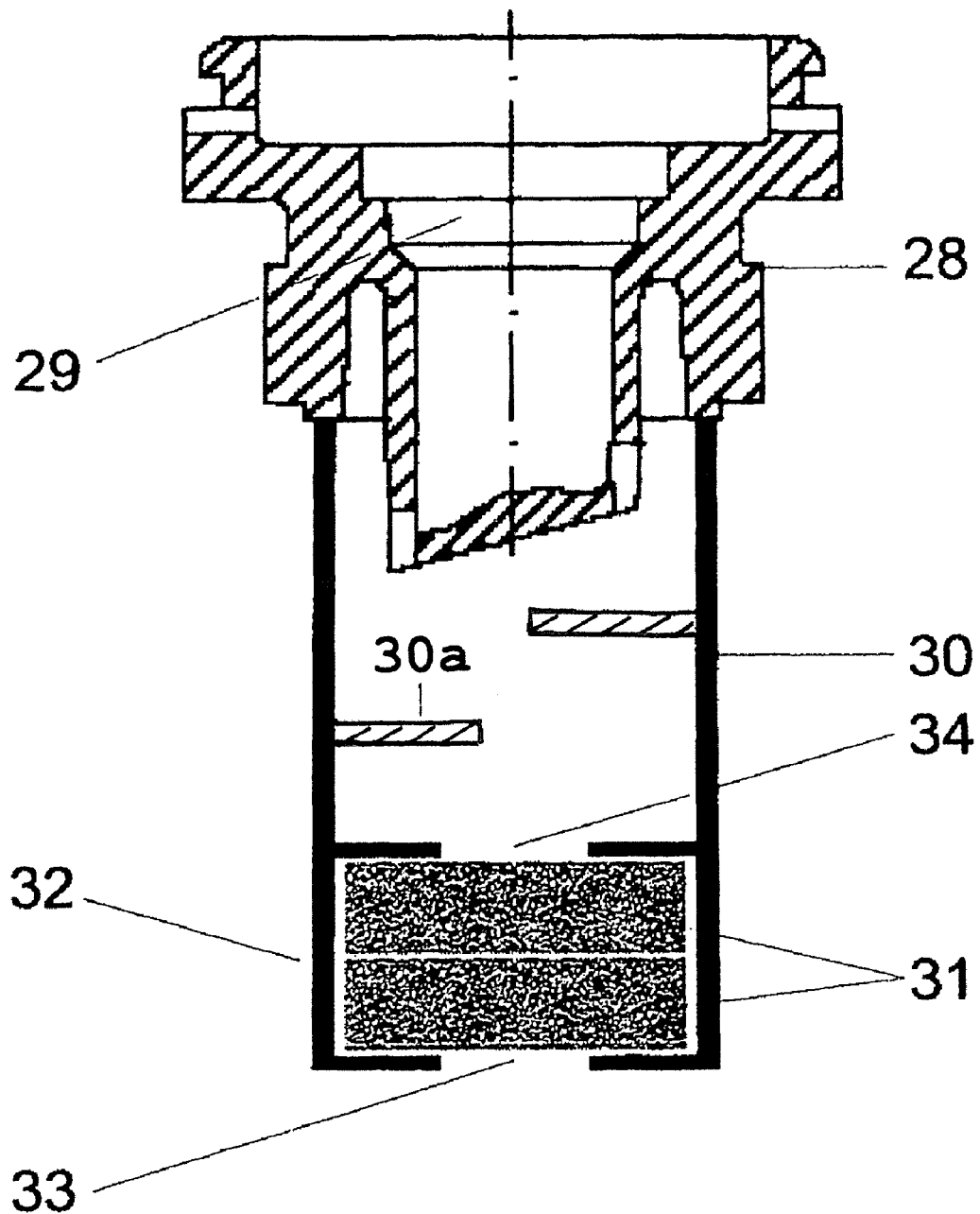
FIG. 2 shows the vent valve of FIG. 1 on an enlarged scale.

A vent valve 20 according to the invention is arranged in the cover 3 of the acid battery 1. The vent valve 20 illustrated in FIG. 1 is shown on an enlarged scale in FIG. 2. The vent valve 20 includes a plug portion 28 with a male screwthread (not shown), by way of which the vent valve 20 is screwed into a valve seat 21 with a female screwthread (not shown), the valve seat 21 being provided in the cover 3. A sealing ring 22 additionally seals off the screwed-in plug portion 28 in relation to the valve seat 21 to prevent the discharge of gas or liquid. A protection cover 23 is additionally provided over the vent valve.

Arranged in the interior of the substantially cylindrical plug portion 28 is a valve arrangement 29 which can be designed in accordance with the any manner known in the state of the art. Extending from the plug portion 28 in the direction of the interior of the battery is a turbulence chamber 30 which in turn is followed by a filter chamber 32. A filter unit 31 which is in the form of two non-woven fabric pieces arranged in mutually superposed relationship is provided in the filter chamber 32. The filter chamber 32 has a gas inlet opening 33 at its lower end and is in communication with the turbulence chamber 30 by way of a communicating opening 34. Disposed in the turbulence chamber 30 are turbulence-producing bodies 30a which are designed for deflecting and causing turbulence in the gas flow passing through the turbulence chamber. Such turbulence-producing bodies 30a can be bodies of any geometry which are loose-fill bodies which are not fixedly secured to the turbulence chamber wall. Turbulence-producing bodies 30a which extend from the turbulence chamber wall are also suitable such as deflection plates, apertured plates and the like, which produce turbulence in and/or deflect the gas flow within the turbulence chamber.

In the event of an excess pressure in the acid battery, gas flows through the gas inlet opening 33 of the filter chamber 32 through the filter unit 31 and from that through the communicating opening 34 and through the turbulence chamber 30 further through the valve arrangement 29 and out of the cell vessel. Liquid and solids entrained by the gas flow are firstly retained by the filter unit 31. Remaining liquid which is not retained by the filter unit 31 is subjected to a turbulence effect with the gas flow in the turbulence chamber 30 and is separated off in the turbulence chamber 30. The gas flow passing to the valve arrangement 29 is therefore substantially liquid-free.

Figure 3:
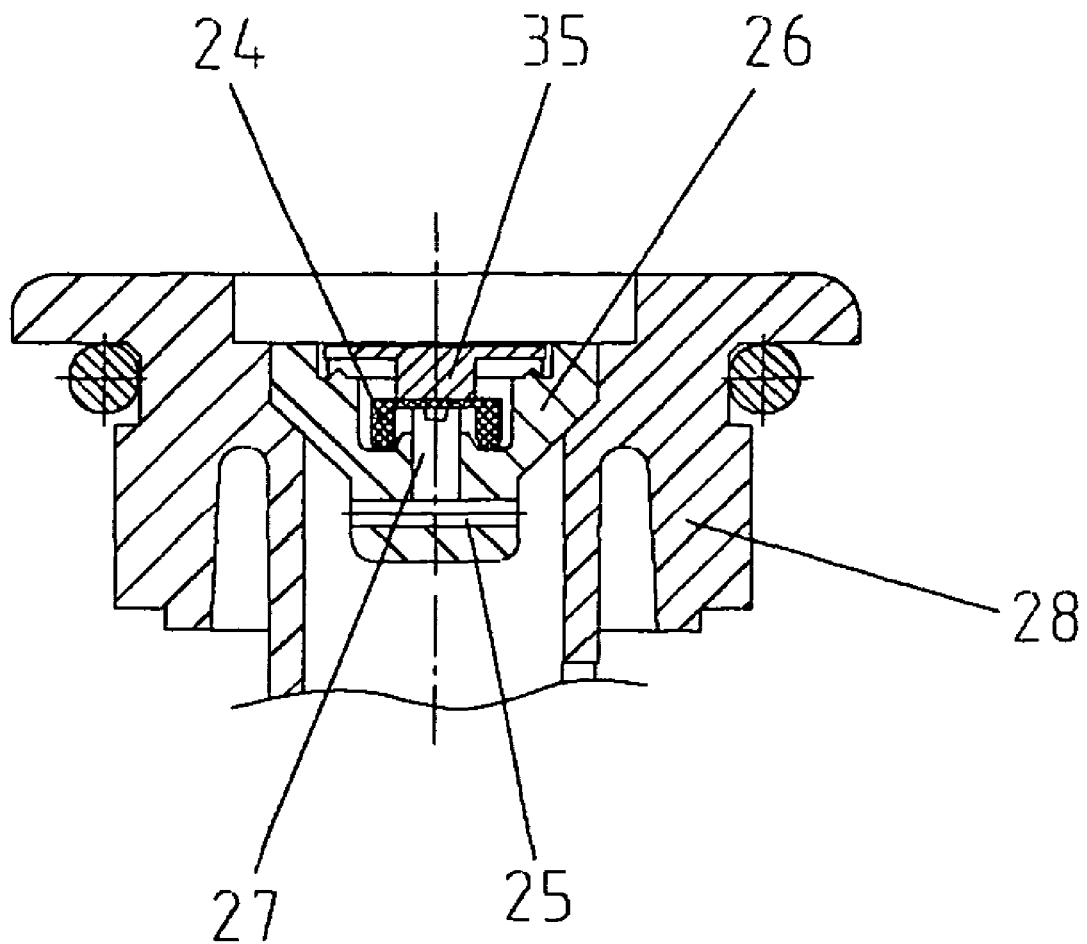
FIG. 3 shows the vent valve of FIGS. 1 and 2, with the valve arrangement in the plug portion also being shown in section in detail.

FIG. 3 shows a detail view of the vent valve 20, wherein the valve arrangement 29 is shown in cross-section and the internal components of the valve arrangement can be seen therein. The valve arrangement includes a valve body 26, an inlet passage 25 which extends transversely with respect to the main direction of flow of the gas, a passage 27 which follows the inlet passage 25 and which in turn extends in the main direction of flow of the gas and which opens in a chamber, and a diaphragm 24 which is so designed that the valve only opens at a predetermined increased pressure. Arranged above the diaphragm is a hold-down means 35 which determines the contact pressure of the diaphragm against the sealing surface and thus the opening pressure.

Figure 4:
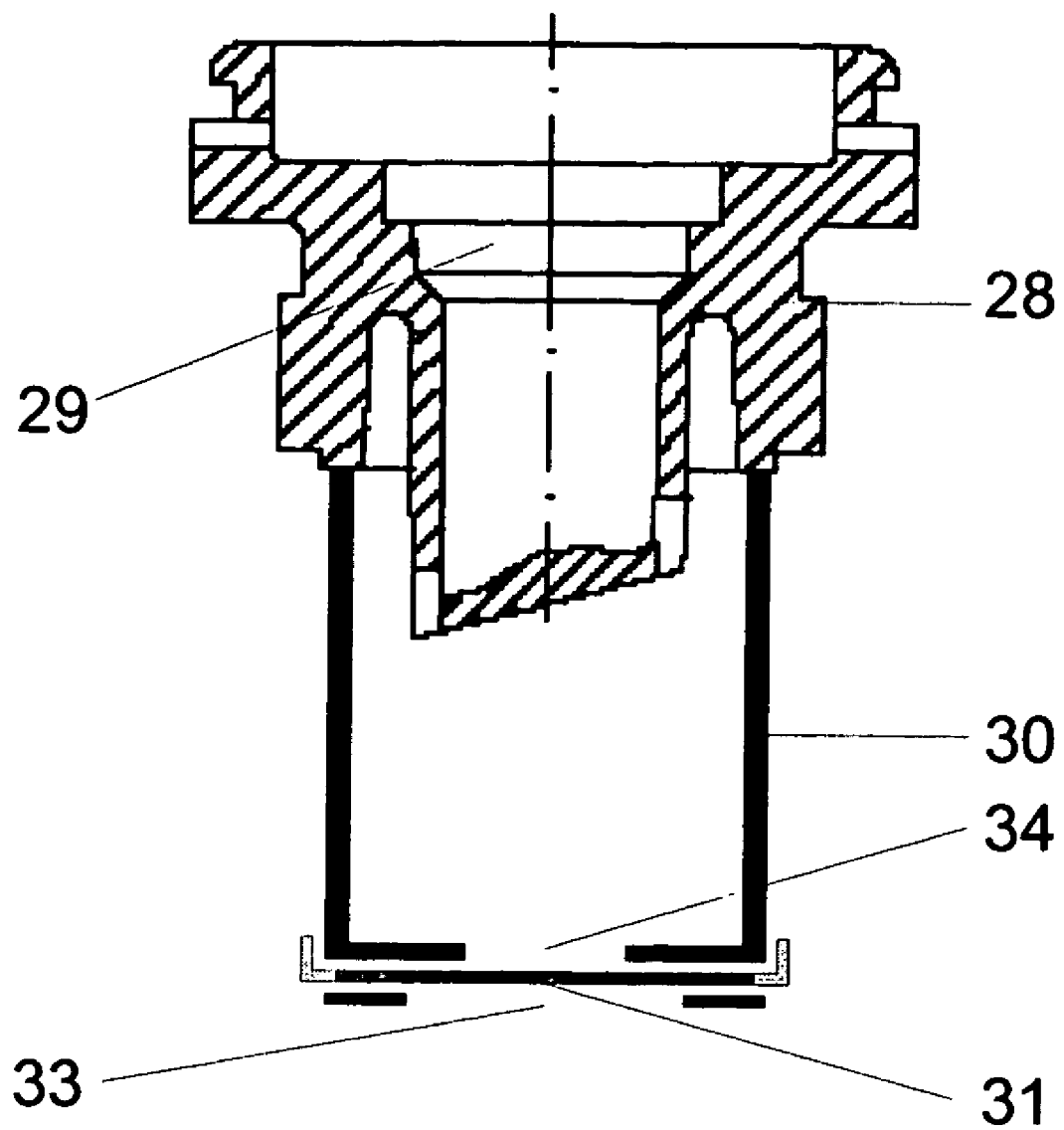
FIG. 4 shows an alternative embodiment of the vent valve according to the invention, in the form of a single-chamber system.

FIG. 4 shows an alternative embodiment of the vent valve according to the invention in the form of a single-chamber system. The structure of the plug portion 28, the valve unit 29 provided therein and the turbulence chamber 30 adjoining the plug portion is substantially like that of the embodiment shown in FIGS. 1 to 3. Arranged upstream of the inlet opening of the turbulence chamber 30 is a filter unit 31' which is of a cap-shaped configuration and which is fitted in an inverted position over the end of the turbulence chamber. The filter unit 31' of the cap-shaped configuration can be bonded to the end of the turbulence chamber by means of an adhesive. Alternatively it can be secured to the end of the turbulence chamber by means of a screw or clip closure.

LIST OF REFERENCES 1 acid battery, accumulator
2 cell vessel
3 cover
4 plate
5 separator
6,6' connecting straps
7,7' pole
8,8' pole ductings 9 electrolyte
10 gas space
20 vent valve
21 valve seat
22 sealing ring
23 protection cover
24 diaphragm
25 inlet passage
26 valve body
27 passage
28 plug portion
29 valve arrangement, pressure valve
30 turbulence chamber
31,31' filter unit
32 filter chamber
33 gas inlet opening to the cell interior
34 gas passage opening from the filter to the turbulence chamber
35 hold-down means

The invention claimed is:

1. A vent valve for acid batteries, which batteries have at least one cell opening, comprising:
    a substantially cylindrical plug portion which is designed for being brought into engagement with a cell opening of the acid battery, and which has at least one passage opening communicating the cell interior of the acid battery with the ambient atmosphere, wherein provided in the passage opening is a valve arrangement having an inlet communicating with the cell interior and an outlet connected to the ambient atmosphere, characterised in that at least one turbulence chamber follows the passage opening of the plug portion in the direction of the cell interior, and
    a gas-permeable filter unit follows the turbulence chamber.

2. A vent valve according to claim 1, characterised in that adjoining the turbulence chamber is a filter chamber which is in communication with the turbulence chamber by way of the at least one passage openings and in which the filter unit is arranged.

3. A vent valve according to claim 1, characterised in that filter unit is fixed upstream of an inlet opening of the turbulence chamber, being push-fitted thereon or bonded thereto.

4. A vent valve to one of the preceding claims 1-3, characterised in that the gas permeable filter unit is made from one or more porous bodies, selected from the group of frit, foam, non-woven fabric, diaphragm, filter paper and cloth.

5. A vent valve according to one of the preceding claims 1-3, characterised in that the gas permeable filter unit is positioned in said filter chamber wherein the turbulence chamber and the filter chamber are of a substantially cylindrical configuration.

6. A vent valve according to one of the preceding claims 1-3, characterised in that arranged in the turbulence chamber are turbulence-producing bodies which are designed for deflection of and producing turbulence in a gas flow passing through the turbulence chamber.

7. A vent valve according to claim 6, characterised in that the acid battery includes a fixed gel electrolyte.

8. A vent valve for acid batteries, comprising:
    a gas inlet opening into the gas space of a battery having a battery cover, said gas inlet opening venting the battery gas space;
    a gas-permeable filter positioned in a pathway of the gas inlet opening for removing electrolyte, liquid, and particles in the battery gas passing there through;
    a turbulence chamber connected to an outlet of the gas-permeable filter for removing liquid remaining in the battery gas passed through the gas-permeable filter; and
    a pressure operative valve connected to the output of the turbulence chamber, the pressure operative valve being normally closed and opening to vent excess pressure from the turbulence chamber, the gas-permeable filter, and the battery gas space.

9. The vent valve of claim 8, wherein the pressure operative valve includes:
    a plug portion extending through the battery cover;
    a valve body held by the plug portion for flow of battery gas;
    an inlet passage extending transversely with respect to the direction of flow of the battery gas through said valve body;
    a main passage having a sealing surface at an outlet end of said main passage and being connected to the inlet passage on an inlet end of said main passage, the main passage extending in the main direction of the flow of battery gas egress;
    a diaphragm extending over an outlet sealing surface of the main passage; and
    a hold down which determines a contact pressure of the diaphragm against the outlet sealing surface and thereby determines an opening pressure of the valve.

10. The vent valve of claim 9, also including:
    a female threaded valve seat in the battery cover; and
    a sealing ring between the plug portion and the valve seat, and
    wherein the inlet passage and the main passage are connected in a T-shape.

11. The vent valve of one of claims 8-9, also including:
    a filter chamber connected to the gas inlet opening on one side and having a gas passage opening into the turbulence chamber on the other side, the filter chamber holding the gas-permeable filter;
    wherein the gas-permeable filter includes two non-wovern fabric pieces arranged in mutually superposed relationship.

* * * * *

UNITED STATES PATENT AND TRADEMARK OFFICE
CERTIFICATE OF CORRECTION

| | | |
|---|---|---|
| PATENT NO. | : 7,951,475 B2 | Page 1 of 1 |
| APPLICATION NO. | : 11/406173 | |
| DATED | : May 31, 2011 | |
| INVENTOR(S) | : Wolfgang Imhof, Friedrich Kramm and Christian Recker | |

It is certified that error appears in the above-identified patent and that said Letters Patent is hereby corrected as shown below:

Column 1, line 26, reads "in a get as so-called gel electrolyte. Silicic acid is usually"
should read -- in a gel as so-called gel electrolyte. Silicic acid is usually --

Column 1, line 56, reads "tested in three mutually perpendicularly positions, in which"
should read -- tested in three mutually perpendicular positions, in which --

Column 3, line 7, reads "the cell vessel. In that situation liquid, in particular electrolyte"
should read -- the cell vessel. In that situation, liquid, in particular electrolyte --

Column 3, line 67, reads "term porous body in accordance with this invention is inter-"
should read -- term "porous body" in accordance with this invention is inter- --

Column 4, line 60, reads "valve according to the invention disposed in the turbulence"
should read -- valve according to the invention, disposed in the turbulence --

Column 5, line 67, reads "designed in accordance with the any manner known in the"
should read -- designed in accordance with any manner known in the --

Signed and Sealed this
Twenty-eighth Day of June, 2011

David J. Kappos
*Director of the United States Patent and Trademark Office*